United States Patent Office 2,758,878
Patented Aug. 14, 1956

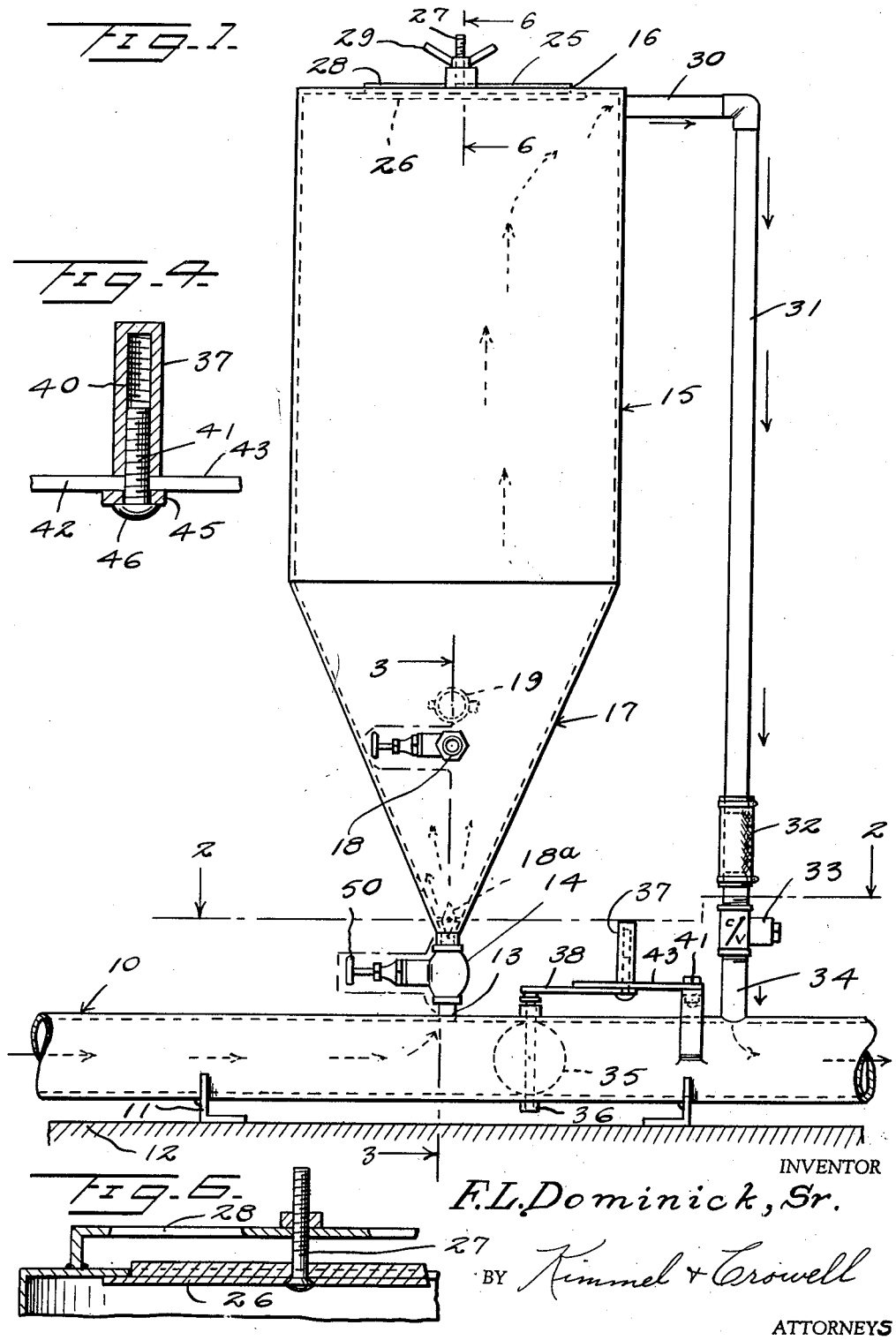

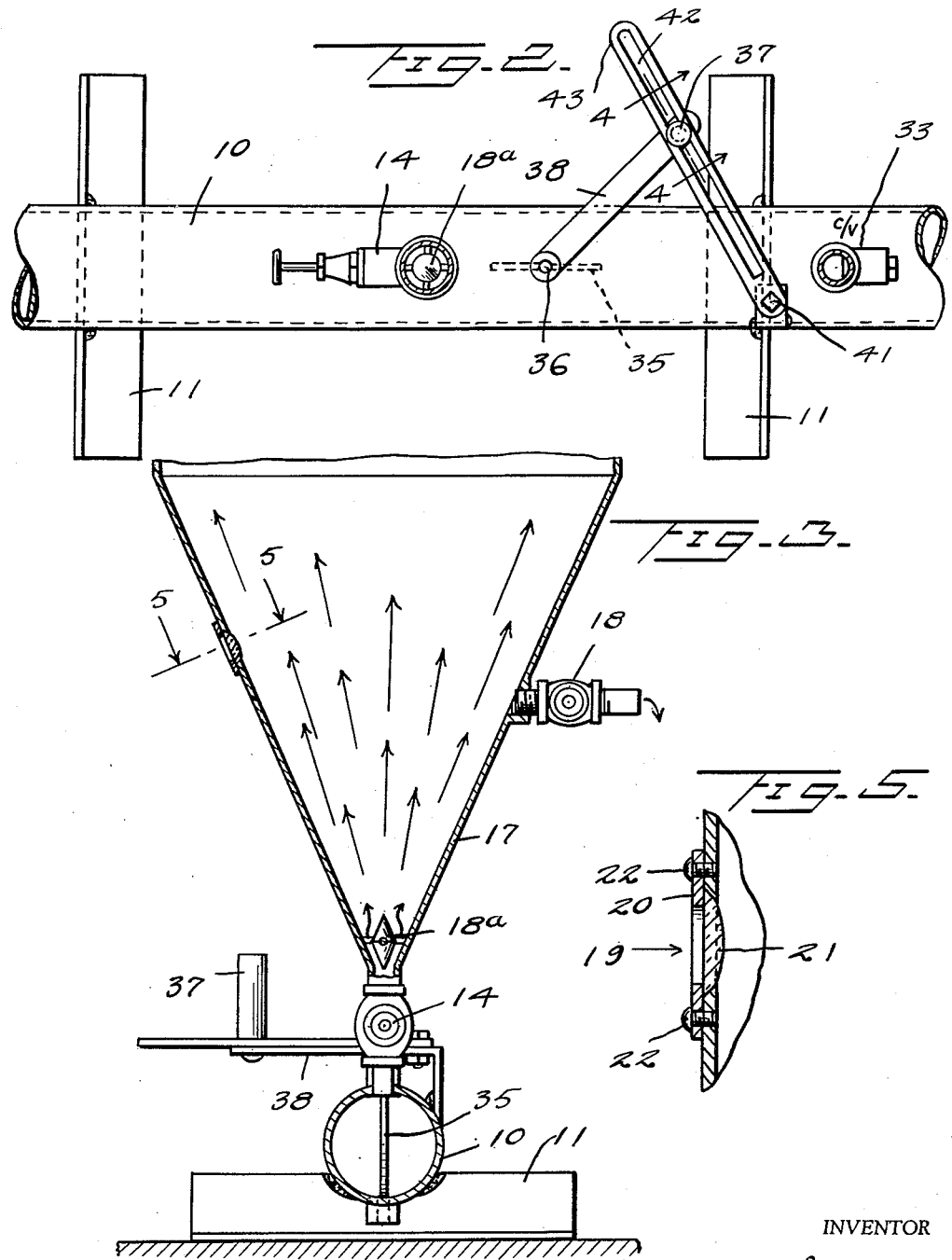

2,758,878

FERTILIZING DEVICE

Floyd L. Dominick, Sr., Salem, Oreg.

Application November 13, 1953, Serial No. 391,890

1 Claim. (Cl. 299—84)

This invention relates to a fertilizing device, and more particularly to a fertilizing device adapted to be utilized in conjunction with irrigation systems.

A primary object of this invention is the provision of a device of this character by means of which water from an irrigation pipe may be by-passed through a receptacle containing fertilizing material to liquefy the material, and return the same to the irrigation line to be disseminated along with the irrigating water.

An additional object of this invention is the provision of a device of this character which may be expeditiously attached to a main irrigating line, and through which any desired amount of water from the main line may be by-passed as desired.

Still other objects reside in the arrangement of parts, combination of elements, and features of construction, all as will be more fully pointed out hereinafter and disclosed in the accompanying drawing wherein it is shown a preferred embodiment of this inventive concept.

In the drawings:

Figure 1 is a side elevational view of one form of the device embodying the principle of the instant inventive concept as shown attached to an irrigation pipe.

Figure 2 is a sectional view taken substantially along the line 2—2 of Figure 1 as viewed in the direction indicated by the arrows.

Figure 3 is a sectional view taken substantially along the line 3—3 of Figure 1 as viewed in the direction indicated by the arrows.

Figure 4 is an enlarged sectional view taken substantially along the line 4—4 of Figure 1 as viewed in the direction indicated by the arrows.

Figure 5 is a fragmentary sectional view taken substantially along the line 5—5 of Figure 3 as viewed in the direction indicated by the arrows.

Figure 6 is an enlarged sectional view taken substantially along the line 6—6 of Figure 1 as viewed in the direction indicated by the arrows.

Similar reference characters refer to similar parts throughout the several views of the drawings.

Having reference now to the drawings in detail, it is generally indicated at 10 a main irrigation pipe, which is carried by supports 11 on suitable base 12, as shown in Figure 1. The pipe is supplied with water in any desired conventional manner for the irrigation of any desired crops. Fixedly secured to the upper portion of pipe 10 is a tube 13, which is controlled by a manually controlled valve 14, the tube 13 communicating through the valve 14 with a hopper 15 which is adapted to contain a solid fertilizing agent of any desired type. The fertilizing agent need not be in a pulverized form, but may be inserted in the hopper 15 through its top aperture 16 in any desired size of chunks sufficiently small to pass through the closure.

Positioned immediately above valve 14 in the inverted conical base 17 is a diffusing member 18a formed in the shape of a pair of base to base secured conical members for diffusing water from pipe 10 which enters the valve 14 in a manner to be described more fully hereinafter. The lower conical portion 17 of hopper 15 is also provided with a drain valve 18 of conventional type and a sight aperture 19, as best shown in Figure 5, which includes a circular boss 20 having a glass plate 21 therein adapted to seat in an aperture in the side wall of the hopper. The plate 21 is secured to the side of the hopper by means of screws 22, or the like.

The top portion of hopper 15 including the opening 16 is adapted to be closed by a conventional boiler inspection type cover 25, which includes, as best shown in Figure 6, a flanged lower plate 26 secured by a bolt 27 in the upper cover plate 28 and held in position as by a wing nut 29. The arrangement is such that when there is pressure within the hopper 15, the lower plate 26 will be forced upwardly against the aperture 16, and accordingly the hopper cannot be opened.

A drain pipe 30 extends from the top of hopper 15 to a vertical pipe 31 and thence through a hose coupling 32 and a check valve 33 to a pipe connection 34 to the main irrigation line 10.

Between the pipes 13 and 34, there is positioned in main irrigation line 10 a butterfly valve 35 mounted on a stem 36, and so arranged as to be turned by means of a handle 37 extending vertically, which is connected to a lever 38 which in turn is fixedly secured to the stem 36. The handle 37, as best shown in Figure 4, includes a threaded bore 40 into which extends a bolt 41 which passes through a slot 42 (see Figure 2) in a lever member 43, which is pivotally secured as by a pivot 44 adjacent the pipe 10. A washer 45 is provided adjacent the head 46 of bolt 41 on the opposite side of lever 43.

In the use and operation of the device, when it is desired merely to irrigate and not to fertilize, the valve 14 is normally closed while butterfly valve 35 is normally open, the position of adjustment being secured by means of bolt 41 being tightened by rotation of handle 37.

When it is desired to supply fertilizer along with irrigation to the crops, butterfly valve 35 may be either partially or wholly closed as desired and valve 14 opened by means of valve handle 50. Under these conditions, water from the main line 10 flows into pipe 13 and about the diffusing member 18a occasioning disturbance in the fertilizer and hopper 15 and passing the same in solution in the water through pipes 30 and 31, hose connection 32, and check valve 33, through pipe 34 back into the main irrigation line. The sight opening 19 permits observation of the quantity of fertilizer in the hopper 15 and when no fertilizer is visible through the sight opening refilling is desirable. Obviously, by means previously described, butterfly valve 35 may be locked in any desired position either partially opened or closed to regulate the amount of water passing through the fertilizer.

Similarly, when it becomes necessary to refill the hopper 15 any remaining fluid therein is drained off through manual valve 18, the valve 14 being meanwhile closed and the device refilled with fertilizer in any desired quantity.

From the foregoing it will now be seen that there is herein provided an improved fertilizing attachment for irrigation systems which permits the ready dissemination of fertilizer in desired amounts at desired times, and thus accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

In a fertilizing device for irrigation systems, a hopper including a frusto-conical lower portion terminating in an inlet opening, an irrigation line, conduit means connecting the bottom of said hopper to said irrigation line, a valve in said conduit means, pipe means connecting the top of said hopper to said line at a point spaced from said conduit, valve means in said irrigation line between said conduit and said pipe, valve means in said pipe means adjacent said line, a diffuser mounted in said hopper adjacent said inlet opening with said diffuser having a configuration of a pair of base connected cones axially aligned with the axis of said hopper, said hopper above said diffuser being internally completely unobstructed to permit turbulent mixing of water and fertilizer therein.

References Cited in the file of this patent

UNITED STATES PATENTS

| | | |
|---|---|---|
| 1,430,840 | Ostler | Oct. 3, 1922 |
| 2,135,969 | Donaldson | Nov. 8, 1938 |
| 2,553,379 | Peterlin | May 15, 1951 |
| 2,589,595 | Aske | Mar. 18, 1952 |
| 2,646,973 | Prizer | July 28, 1953 |
| 2,683,622 | Dragon | July 13, 1954 |